US012637962B2

(12) United States Patent
Radon et al.

(10) Patent No.: US 12,637,962 B2
(45) Date of Patent: May 26, 2026

(54) STATIC DE-AERATOR AND LUBRICANT SYSTEM

(71) Applicant: Pratt & Whitney Canada Corp., Longueuil (CA)

(72) Inventors: Joanna Radon, Rakszawa (PL); Ho-Wing Edmund Leung, Chambly (CA)

(73) Assignee: Pratt & Whitney Canada Corp., Longueuil (CA)

( * ) Notice: Subject to any disclaimer, the term of this patent is extended or adjusted under 35 U.S.C. 154(b) by 0 days.

(21) Appl. No.: 19/081,818

(22) Filed: Mar. 17, 2025

(65) Prior Publication Data

US 2025/0277458 A1     Sep. 4, 2025

Related U.S. Application Data

(63) Continuation of application No. 18/070,107, filed on Nov. 28, 2022, now Pat. No. 12,253,001.

(51) Int. Cl.
*F01D 25/20* (2006.01)
*F16N 39/00* (2006.01)
(52) U.S. Cl.
CPC ........... *F01D 25/20* (2013.01); *F16N 39/002* (2013.01); *F05D 2230/30* (2013.01); *F05D 2260/98* (2013.01); *F16N 2210/02* (2013.01)
(58) Field of Classification Search
CPC .. F01D 25/20; F05D 2230/30; F05D 2260/98; F16N 2210/02
See application file for complete search history.

(56) References Cited

U.S. PATENT DOCUMENTS

| | | | |
|---|---|---|---|
| 1,565,318 | A | 12/1925 | Fisher |
| 2,705,053 | A | 3/1955 | Morris |
| 3,349,548 | A | 10/1967 | Boyen |
| 3,988,132 | A | 10/1976 | Oranje |
| 4,559,068 | A | 12/1985 | Lagerstedt |
| 6,709,476 | B2 | 3/2004 | Kitano |
| 11,255,265 | B2 | 2/2022 | Gebhard |
| 2008/0029071 | A1 | 2/2008 | Saito |
| 2009/0183950 | A1 | 7/2009 | Brouillet |
| 2010/0065375 | A1* | 3/2010 | Dickie .................. F16N 39/002 |
| | | | 55/290 |

(Continued)

FOREIGN PATENT DOCUMENTS

| | | |
|---|---|---|
| KR | 2019137370 | 12/2019 |

*Primary Examiner* — Nathaniel E Wiehe
*Assistant Examiner* — Theodore C Ribadeneyra
(74) *Attorney, Agent, or Firm* — Getz Balich LLC

(57) ABSTRACT

A de-aerator is provided that includes a body, a cover panel, a fluid inlet, a helical fluid passage, at least one partition, and at least one fluid outlet. The body extends between opposing first and second axial ends. The body has a sidewall, a base panel, and an internal cavity. The fluid inlet is in communication with the body and is configured to direct fluid tangentially into the internal cavity. The helical fluid passage is disposed within the internal cavity and has entry and exit ends. The helical fluid passage has circumferential turns that each include an air passage. The at least one partition is disposed within the internal cavity at or below the passage exit end, spaced above the base panel. The at least one fluid outlet is configured to permit liquid passage from the internal cavity of the body to outside the body.

19 Claims, 9 Drawing Sheets

(56) References Cited

U.S. PATENT DOCUMENTS

| | | |
|---|---|---|
| 2010/0187180 A1 | 7/2010 | Baten |
| 2012/0234174 A1 | 9/2012 | Rollins |
| 2018/0117510 A1 | 5/2018 | Shanov |
| 2018/0119617 A1 | 5/2018 | Pulter |
| 2020/0392866 A1 | 12/2020 | Younes |
| 2021/0156515 A1 | 5/2021 | Schetzel |

* cited by examiner

STATIC DE-AERATOR AND LUBRICANT SYSTEM

This application is a continuation of U.S. patent application Ser. No. 18/070,107 filed Nov. 28, 2022, which is hereby incorporated by reference in their entirety.

BACKGROUND OF THE INVENTION

1. Technical Field

The application relates generally to gas turbine engines and, more particularly, to fluid systems for such engines.

2. Background Information

Many components of gas turbine engines require lubrication and cooling. Such components may be shaft bearings, gear boxes, and the like. Gas turbine engines typically comprise an oil tank and an oil pump in fluid communication with an oil circuit configured to circulate oil to these components requiring lubrication. Oil circuits are not always leak proof and air that enters the circuit can mix with the oil. The resulting air-oil mixture is thus routed to the components and can affect the lubricating efficiency. A de-aerator is thus typically used to extract any air from the air-oil mixture before the oil is routed back through the oil circuit. However, existing de-aerators are not always able to extract all the air from the air-oil mixture.

What is needed is an improved de-aerator.

SUMMARY

According to an aspect of the present disclosure, a de-aerator for an oil system of a gas turbine engine is provided. The de-aerator includes a body, a cover panel, a fluid inlet, a helical fluid passage, at least one partition, and at least one fluid outlet. The body extends between a first axial end and a second axial end opposite the first axial end. The body has at least one sidewall that extends between the first axial end and the second axial end, and a base panel connected to the at least one sidewall at the second axial end. The base panel and the at least one sidewall define an internal cavity of the body. The cover panel is connected to the body at the first axial end. The fluid inlet is in communication with the body at the first axial end. The fluid inlet has an internal flow passage configured to direct fluid tangentially into the internal cavity. The helical fluid passage is disposed within the internal cavity and has an entry end and an exit end. The entry end is disposed to receive fluid from the fluid inlet. The helical fluid passage has a plurality of circumferential turns that collectively axially descend toward the second axial end of the body. The circumferential turns each include one or more air passages disposed radially inward providing a gas path to a central region disposed radially inside of the helical fluid passage. The at least one partition is disposed within the internal cavity at or below the exit end of the helical fluid passage and is spaced above the base panel of the de-aerator. The at least one fluid outlet is disposed adjacent the base panel, and the at least one fluid outlet is configured to permit liquid passage from the internal cavity of the body to outside the body.

In any of the aspects or embodiments described above and herein, a partition may be disposed within the internal cavity in a plane that is substantially perpendicular to a central axis of the de-aerator, or a partition may be disposed within the internal cavity in a plane that is canted relative to a central axis of the de-aerator.

In any of the aspects or embodiments described above and herein, a partition may have an upper surface, a lower surface, a thickness extending between the upper surface and the lower surface, and a plurality of apertures extending through the partition between the upper surface and the lower surface.

In any of the aspects or embodiments described above and herein, a sidewall may have an interior sidewall surface and a partition may have a circumferential edge contiguous with the interior sidewall surface.

In any of the aspects or embodiments described above and herein, apertures in a partition may be arranged in a pattern concentric with the center axis.

In any of the aspects or embodiments described above and herein, the at least one partition may include a first partition and a second partition axially spaced apart from one another.

In any of the aspects or embodiments described above and herein, a partition may have an upper surface, a lower surface, a thickness extending between the upper surface and the lower surface, and a circumferential edge, and the sidewall may have an interior sidewall surface and at least a portion of the partition circumferential edge may be spaced apart from the interior sidewall surface thereby forming a passage between the circumferential edge and the interior sidewall surface.

In any of the aspects or embodiments described above and herein, the de-aerator may include a centrally located vent tube that extends substantially parallel to a central axis of the de-aerator, and the helical fluid passage may include a helically extending panel that extends between an interior surface of a sidewall and an exterior surface of the vent tube, and an outer radial surface of the helical fluid passage may be defined by the sidewall interior surface, and an inner radial surface of the helical fluid passage may be defined by the exterior surface of the vent tube.

In any of the aspects or embodiments described above and herein, the de-aerator may include a plurality of vent apertures aligned with the helical fluid passage and extending through the vent tube wall.

In any of the aspects or embodiments described above and herein, the helical fluid passage may include at least one helically extending panel that extends radially inwardly from an interior surface of a sidewall to an inner radial edge, and may include an inner radial wall joined to the inner radial edge of the helically extending panel.

In any of the aspects or embodiments described above and herein, the helical fluid passage may be an enclosed passage.

In any of the aspects or embodiments described above and herein, the de-aerator may include a plurality of vent apertures disposed in the inner radial wall.

In any of the aspects or embodiments described above and herein, the inner radial wall may extend axially a distance and may define a passage above the inner radial wall configured to permit passage of air out of the helical fluid passage and into a central region of the de-aerator.

In any of the aspects or embodiments described above and herein, the at least one helically extending panel may include a first helically extending panel and a second helically extending panel, each extending radially inwardly from the sidewall interior surface, and the inner radial wall may extend between the first helically extending panel and the second helically extending panel to form an enclosed helical fluid passage.

In any of the aspects or embodiments described above and herein, a fluid outlet may be disposed in the base panel.

In any of the aspects or embodiments described above and herein, a fluid outlet may be disposed in a side wall.

In any of the aspects or embodiments described above and herein, the de-aerator may include a fluid collection body disposed radially outside of the at least one sidewall, wherein the fluid collection body may be substantially concentric with and radially spaced apart from, an exterior surface of the at least one sidewall to form an annular cavity there between.

In any of the aspects or embodiments described above and herein, the at least one sidewall, the base panel, the fluid inlet, the helical fluid passage, and the at least one partition may be a unitary structure formed using an additive manufacturing technique.

In any of the aspects or embodiments described above and herein, the cover panel may be part of the unitary structure.

According to another aspect of the present disclosure, a lubrication system for a gas turbine engine is provided that includes a lubricant tank, a lubricant pump, a scavenge pump, and a de-aerator. The de-aerator includes a body, a cover panel, a fluid inlet, a helical fluid passage, at least one partition, and at least one fluid outlet. The body extends between a first axial end and a second axial end opposite the first axial end. The body has at least one sidewall that extends between the first axial end and the second axial end, and a base panel connected to the at least one sidewall at the second axial end. The base panel and the at least one sidewall define an internal cavity of the body. The cover panel is connected to the body at the first axial end. The fluid inlet is in communication with the body at the first axial end. The fluid inlet has an internal flow passage configured to direct fluid tangentially into the internal cavity. The helical fluid passage is disposed within the internal cavity and has an entry end and an exit end. The entry end is disposed to receive fluid from the fluid inlet. The helical fluid passage has a plurality of circumferential turns that collectively axially descend toward the second axial end of the body. The circumferential turns each include one or more air passages disposed radially inward providing a gas path to a central region disposed radially inside of the helical fluid passage. The at least one partition is disposed within the internal cavity at or below the exit end of the helical fluid passage and is spaced above the base panel of the de-aerator. The at least one fluid outlet is disposed adjacent the base panel, and the at least one fluid outlet is configured to permit liquid passage from the internal cavity of the body to outside the body. The lubricant tank, lubricant pump, scavenge pump, and de-aerator are in fluid communication with one another and form a lubrication circuit, such that the lubricant pump is configured to pump lubricant from the lubricant tank to one or more engine components, and the scavenge pump is configured to pump lubricant received from the one or more engine components to the de-aerator, and lubricant passing through the de-aerator is passed into the lubricant tank.

The foregoing features and elements may be combined in various combinations without exclusivity, unless expressly indicated otherwise. For example, aspects and/or embodiments of the present disclosure may include any one or more of the individual features or elements disclosed above and/or below alone or in any combination thereof. These features and elements as well as the operation thereof will become more apparent in light of the following description and the accompanying drawings. It should be understood, however, the following description and drawings are intended to be exemplary in nature and non-limiting.

DETAILED DESCRIPTION

Figure 1:
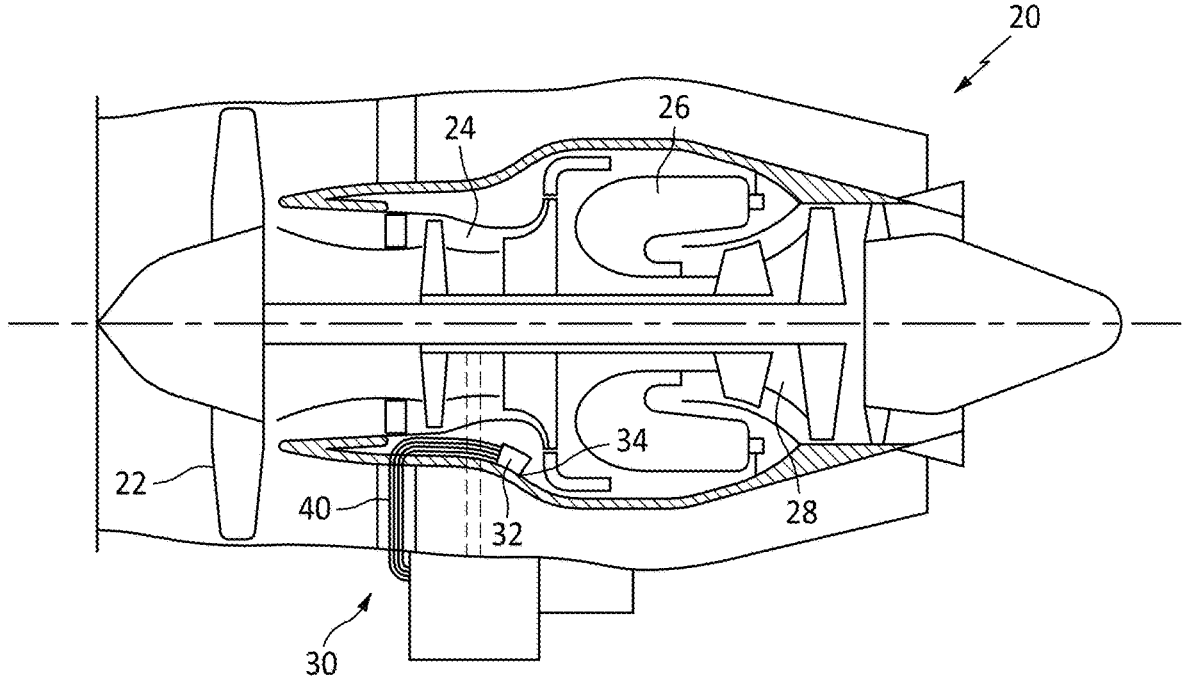
FIG. 1 is a diagrammatic sectional view of a gas turbine engine.
Figure 2:
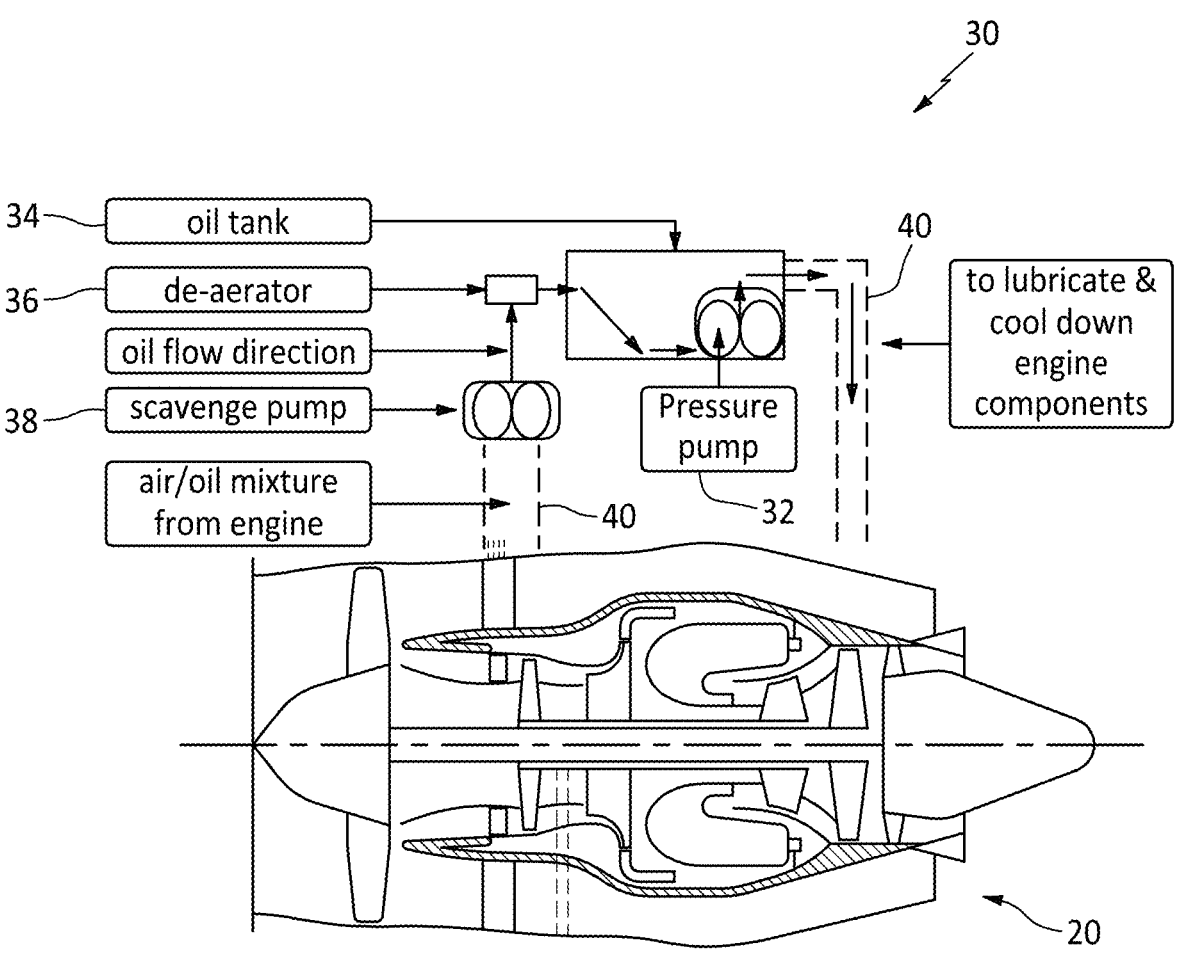
FIG. 2 is a diagrammatic sectional view of a gas turbine engine having a lubricant system.

FIGS. 1 and 2 illustrate a gas turbine engine 20 of a type preferably provided for use in subsonic flight, generally comprising in serial flow communication a fan 22 through which ambient air is propelled, a compressor section 24 for pressurizing the air, a combustor 26 in which the compressed air is mixed with fuel and ignited for generating an annular stream of hot combustion gases, and a turbine section 28 for extracting energy from the combustion gases. The present disclosure may be used within conventional through-flow engines, or reverse flow engines, and gas turbine engine types such as turbofan engines, turboprop engines, turboshaft engines, auxiliary power unit (APU), and the like.

The engine 20 further comprises one or more fluid systems, such as a lubricant system 30 that circulates lubricant to both lubricate and cool components; e.g., bearings, gears (e.g., within a gearbox), and other components. The lubricant system 30 includes a lubricant pump 32, a lubricant tank 34, a de-aerator 36, and a scavenge pump 38 all in fluid flow communication with each other. The lubricant system 30 includes piping 40 that interconnects the aforesaid components. In some embodiments, the de-aerator 36 may be disposed in the lubricant tank 34 and in other embodiments, the de-aerator 36 may be disposed in-line outside the lubricant tank 34. Regardless of where the de-aerator 36 is disposed, the space available for the de-aerator 36 is often limited. Even in those instances where space is not constrained, a smaller de-aerator 36 will likely be advantageously lower in weight.

FIG. 2 diagrammatically illustrates a lubricant system 30 circuit. Lubricant within the lubricant tank 34 is pumped to an elevated pressure via a mechanical pump 32 and is supplied to the engine 20 where it is specifically applied to various components for lubrication and/or cooling purposes. Once the lubricant has engaged one or more of the engine components, a scavenge pump 38 is employed to recover the lubricant from the engine 20. Within the circuit, air is often drawn into the circuit and becomes entrained within the lubricant. In the lubricant system 30 circuit shown in FIG. 2, the lubricant passes from the scavenge pump 38 into the de-aerator 36. The de-aerator 36 removes the entrained air and passes the de-aerated lubricant back into the lubricant tank 34 and the cycle repeats itself. The lubricant system 30 circuit shown in FIG. 2 is diagrammatic and the present disclosure is not limited to this diagrammatic lubricant circuit and/or the components included. In many instances, additional components such as a heat exchanger and the like may be included.

Figure 3:
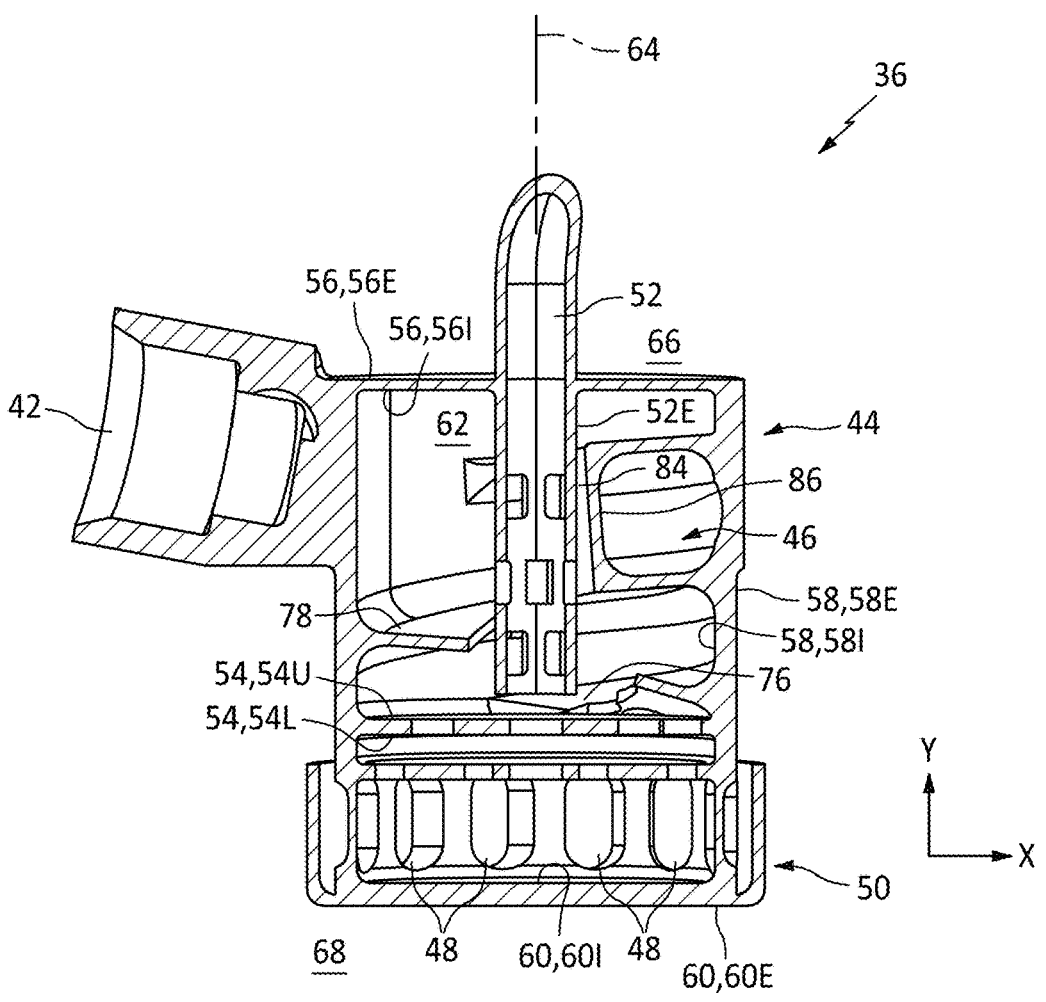
FIG. 3 is a diagrammatic sectional view of a de-aerator embodiment.

FIG. 3 is a diagrammatic illustration of a de-aerator 36 embodiment according to the present disclosure. The de-aerator 36 includes a fluid inlet 42, a body 44, a helical fluid passage 46, and one or more fluid outlets 48. In some embodiments, the de-aerator 36 may also include one or more of a fluid collection body 50, a vent tube 52, and one or more partitions 54.

The de-aerator body 44 is configured to contain fluids for de-aerating and includes a cover panel 56, at least one sidewall 58, a base panel 60, and an internal cavity 62. The cover panel 56, sidewall 58, and base panel 60 each include an interior surface 56I, 58I, 60I and an exterior surface 56E, 58E, 60E. The body 44 may be described as having a center axis 64 that extends along a y-axis, and has a width that extends along an X-axis, where the X and Y axes are orthogonal axes. The cover panel 56 is disposed at a first axial end 66 of the body 44 and the base panel 60 is disposed at a second axial end 68 of the body 44, opposite the first axial end 66. The base panel 60 is connected to the sidewall 58 at the second axial end 68. In the embodiment shown in FIG. 3, the de-aerator body 44 is substantially cylindrically shaped having a single sidewall 58. The present disclosure is not, however, limited to de-aerators 36 having a cylindrical shape. For example, the de-aerator body 44 may be frustoconical or may have linear side walls (e.g., rectangular, square, pentagonal, or octagonal) or may vary in diameter in some portions.

Figure 3A:
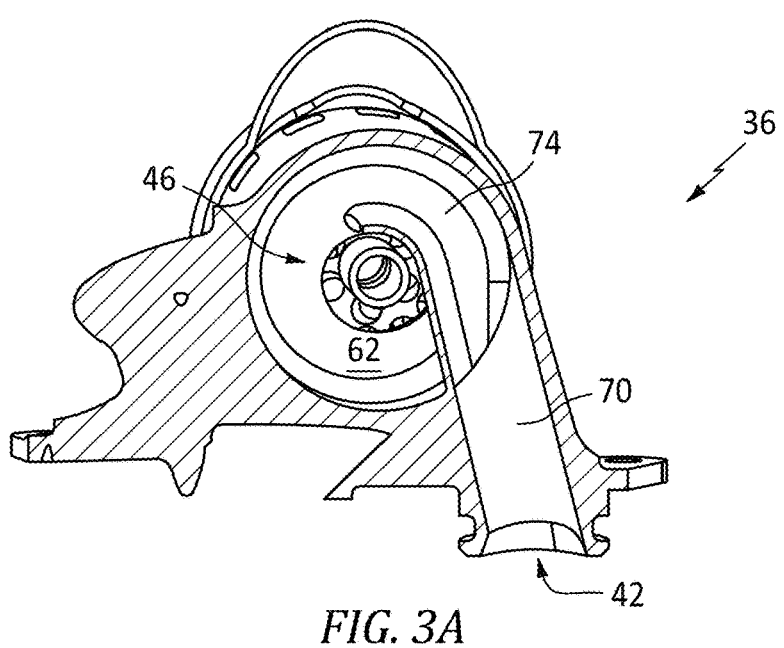
FIG. 3A is a diagrammatic top sectional view of the de-aerator embodiment shown in FIG. 3.
Figure 3B:
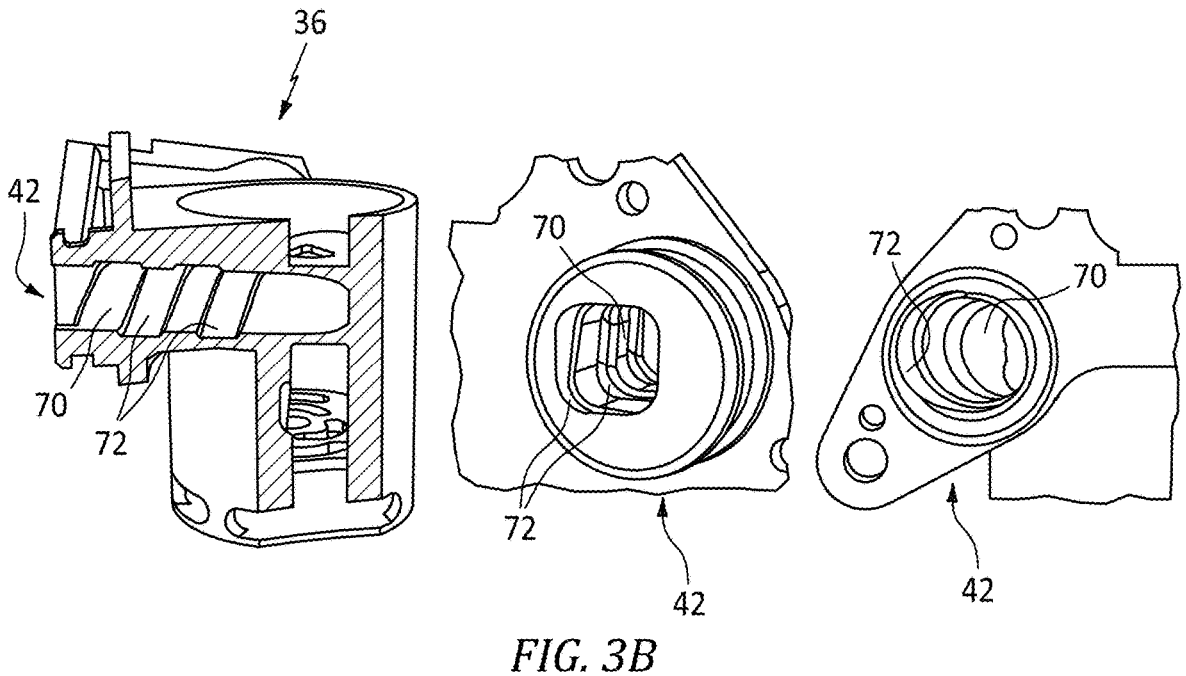
FIG. 3B are partial views of a de-aerator showing fluid inlet embodiments.

Referring to FIGS. 3-3B, the fluid inlet 42 is disposed adjacent the cover panel 56 at the first axial end 66. The fluid inlet 42 is configured to have an internal flow passage 70 that directs fluid tangentially into internal cavity 62 and into the helical fluid passage 46, at an axial position near the first axial end 66; e.g., the fluid inlet direction is predominantly circumferentially in an X-plane and may in some embodiments have an axial component (Y-axis) substantially smaller than the X-plane circumferential component. Hence, the fluid inlet 42 directs air-entrained fluid in a direction along the circumferential periphery of the internal cavity 62 (into the helical fluid passage 46). The internal flow passage 70 is not limited to any particular geometry. Examples of acceptable inlet internal flow passage 70 geometries include circular, rectangular, oval, and the like. In some embodiments, the inlet internal flow passage 70 may include helical grooving ("swirl grooves 72") in the wall that defines the inlet internal flow passage 70 (See FIG. 3B). The swirl grooves 72 are configured to impart a swirling motion to at least part of the inlet fluid flow as it is directed tangentially into the internal cavity 62 of the body 44. The swirl grooves 72 can be formed in several different configurations, for example, a semi-circular channel, etc. The swirl grooves 72 are understood to increase the residency time of the fluid passing through the de-aerator 36 and to facilitate the liberation of air from the air-entrained fluid.

The helical fluid passage 46 is configured to contain the fluid entering the internal cavity 62 of the de-aerator 36 and direct it in a helical path between an entry end 74 (see FIG. 3A) and an exit end 76. The helical fluid passage 46 including a plurality of circumferential turns between the entry and exit ends 74, 76, axially descending toward the second axial end 68 of the body 44. Each circumferential turn extends once circumferentially around the center axis 64. As a result of the helical fluid passage 46 configuration, centrifugal force acts on the fluid forcing the liquid portion of the fluid (with its mass greater than air) radially outwardly and causing separation of the liquid portion of the fluid from the entrained air portion of the fluid.

Figures 4, 5:
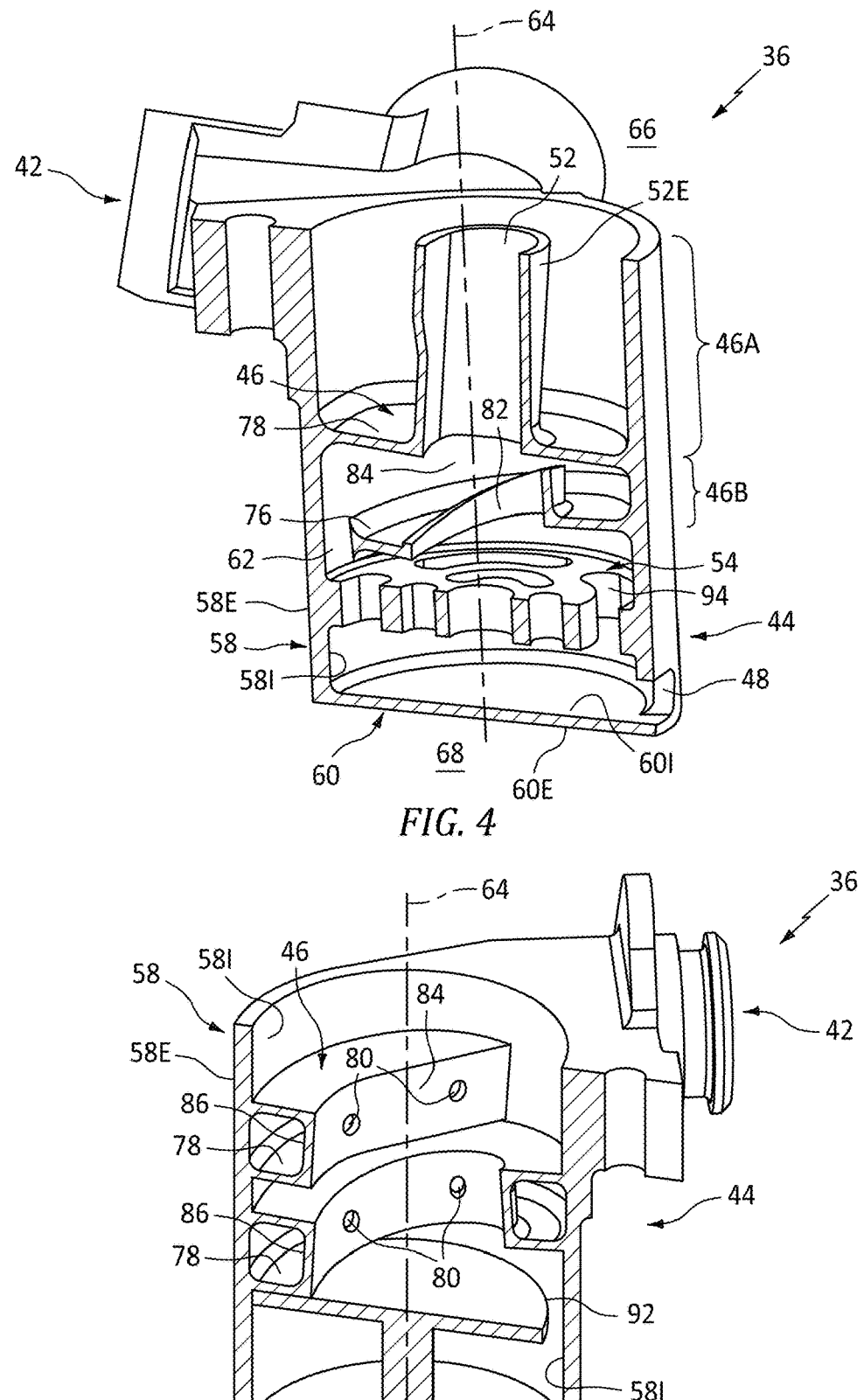
FIG. 4 is a diagrammatic sectional view of a de-aerator embodiment.
FIG. 5 is a diagrammatic sectional view of a de-aerator embodiment.

Referring to FIGS. 3 and 5, in some embodiments the helical fluid passage 46 may be formed independent of a vent tube 52 (not shown in FIG. 5). In these embodiments, the helical fluid passage 46 again uses the sidewall interior surface 58I as the outer radial surface of the passage 46, and an inner radial wall 86 forms the inner radial surface of the passage 46. In some embodiments (e.g., as shown in FIG. 3), a single helically extending panel 78 forms the axially upper and lower surfaces of the passage 46 except towards the axial ends of the passage 46. In other embodiments, a plurality of helically extending panels 78 form the axially upper and lower surfaces of the passage 46 (e.g., as shown in FIG. 5). In these embodiments, vent apertures 80 may be disposed in the inner radial wall 86 of the passage 46 to permit the passage of air out of the passage 46. FIG. 3 illustrates a vent tube 52 disposed in a central region 84 radially inside of the helical fluid passage 46.

The de-aerator 36 embodiment shown in FIG. 4 includes a helical fluid passage 46 with a first section 46A and a second section 46B. The first section 46A begins at the inlet internal flow passage (not shown in FIG. 4) and extends to the second section 46B. The second section 46B ends at the helical fluid passage exit end 76 open to the bottom of the de-aerator 36. The first section 46A is formed by a helically extending panel 78 that extends between the interior surface 58I of the sidewall 58 and an exterior surface 52E of a centrally disposed vent tube 52. Hence, the outer radial surface of the helical fluid passage 46 is the sidewall interior surface 58I, the inner radial surface of the helical fluid passage 46 is the exterior surface 52E of the vent tube 52. In this embodiment, the vent tube 52 does not extend substantially to the bottom of the de-aerator 36, but rather terminates approximately in the axial middle of the de-aerator 36. The second section 46A of the helical fluid passage 46 includes an inner radial wall 82 that does not fully enclose the helical fluid passage 46. As a result, air liberated from the entrained air fluid is free to pass over the inner radial wall 82, into a central region 84 of the de-aerator 36, and pass thereafter into the vent tube 52 for passage out of the de-aerator 36. The de-aerator 36 embodiment shown in FIG. 4 is an example and is therefore non-limiting. As an alternative to the embodiment shown in FIG. 4, a de-aerator 36 may not include a helical fluid passage 46 with first and second sections, but rather has a vent tube 52 that extends further toward the second axial end 68 and has a helically extending panel 78 that extends between the interior surface 58I of the sidewall 58 and an exterior surface 52E of a centrally disposed vent tube 52 as described above. In these embodiments, vent apertures may be disposed in the vent tube 52 to allow air to pass from the helical fluid passage 46 into the vent tube 52.

Figure 6:
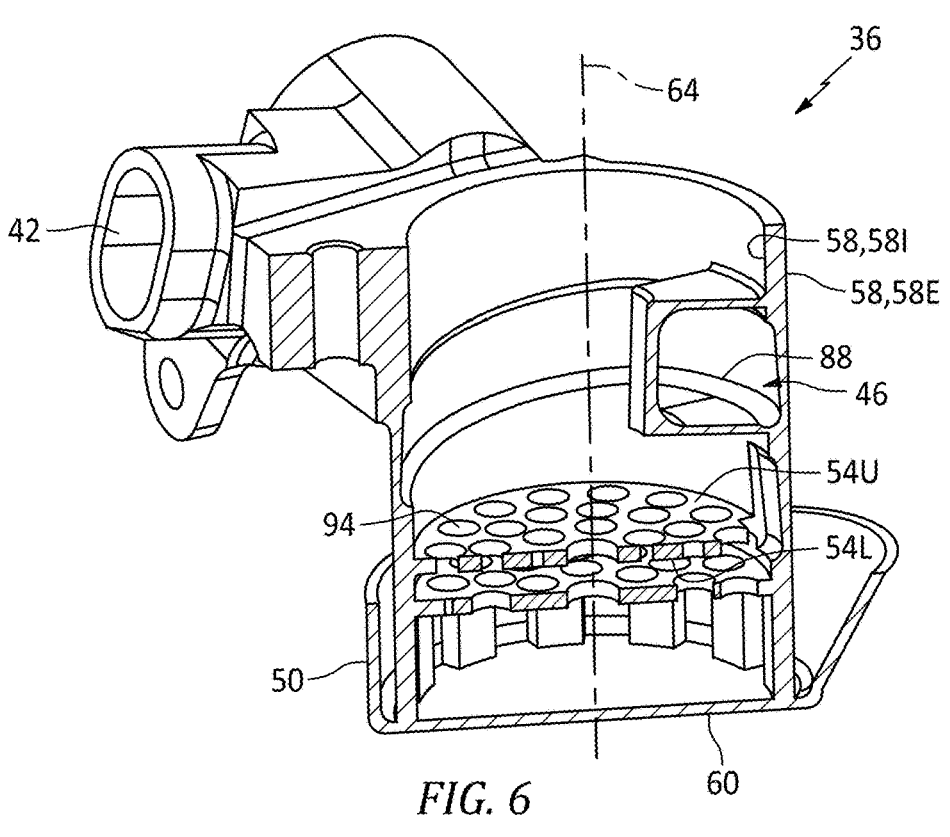
FIG. 6 is a diagrammatic sectional view of a de-aerator embodiment.

Referring to FIG. 6, in some embodiments the helical fluid passage 46 may be formed in part by a helical groove 88 disposed in the sidewall interior surface 58I. The present disclosure is not limited to any particular groove 88 configuration within the sidewall interior surface 58I.

The helical fluid passage 46 examples shown in FIGS. 3-6 are examples of how the helical fluid passage 46 may be configured and the present disclosure is not limited to these examples.

The air liberated from the air entrained fluid collects centrally before exiting the de-aerator 36. As indicated above, some embodiments may include a vent tube 52 that is integral with the helical fluid passage 46, extending axially into the de-aerator 36 to the lower axial region of the de-aerator body 44. The vent tube 52 may extend axially through the cover panel 56 and continue outside the de-aerator 36 for venting elsewhere (e.g., see FIG. 7). In other embodiments, the de-aerator 36 may include a central region 84 defined at least in part by the enclosed helical fluid passage 46 (e.g., see FIG. 4). Separated air may exit the de-aerator 36 via the central region 84, and the cover panel 56 may include a tube either connected to the cover panel 56 or extending through the cover panel 56 that provides an exit air passage for venting outside of the de-aerator 36.

The de-aerator 36 includes at least one partition 54 disposed at or below the exit of the helical fluid passage 46 and spaced above the base panel 60 of the de-aerator 36. The partition 54 has an upper surface 54U, a lower surface 54L, a thickness 90 extending between the upper and lower surfaces 54U, 54L, and a circumferential edge 92 (e.g., see FIG. 7). The partition 54 may extend within the internal cavity 62 in a plane that is substantially perpendicular to the central axis 64. Alternatively, in some embodiments a partition 54 may extend within the internal cavity 62 in a plane that canted (i.e., not perpendicular) relative to the central axis 64. As will be detailed below, in some embodiments the circumferential edge 92 of the partition 54 may be either contiguous with, or connected to, the interior sidewall surface 58I (e.g., se FIG. 7); i.e., no purposeful fluid passage is disposed between the circumferential edge 92 of the partition 54 and the interior sidewall surface 58I and the partition 54 extends entirely across the internal cavity 62 from sidewall 58 to sidewall 58. In some embodiments, at least a part of the circumferential edge 92 of the partition 54 may be spaced apart from the interior sidewall surface 58I to form a fluid passage between the circumferential edge 92 of the partition 54 and the interior sidewall surface 58I (see FIG. 5). During operation, fluid will exit the helical fluid passage 46 at a circumferential fluid velocity and will encounter the partition(s) 54. The partition(s) 54 in combination with the body sidewalls 58 are configured to slow the velocity of the fluid exiting the helical fluid passage 46, disperse the fluid, and thereby provide additional opportunity for any air entrained within the fluid to separate and enter the vent tube 52 or the central cavity for passage out of the de-aerator 36.

Figure 7:
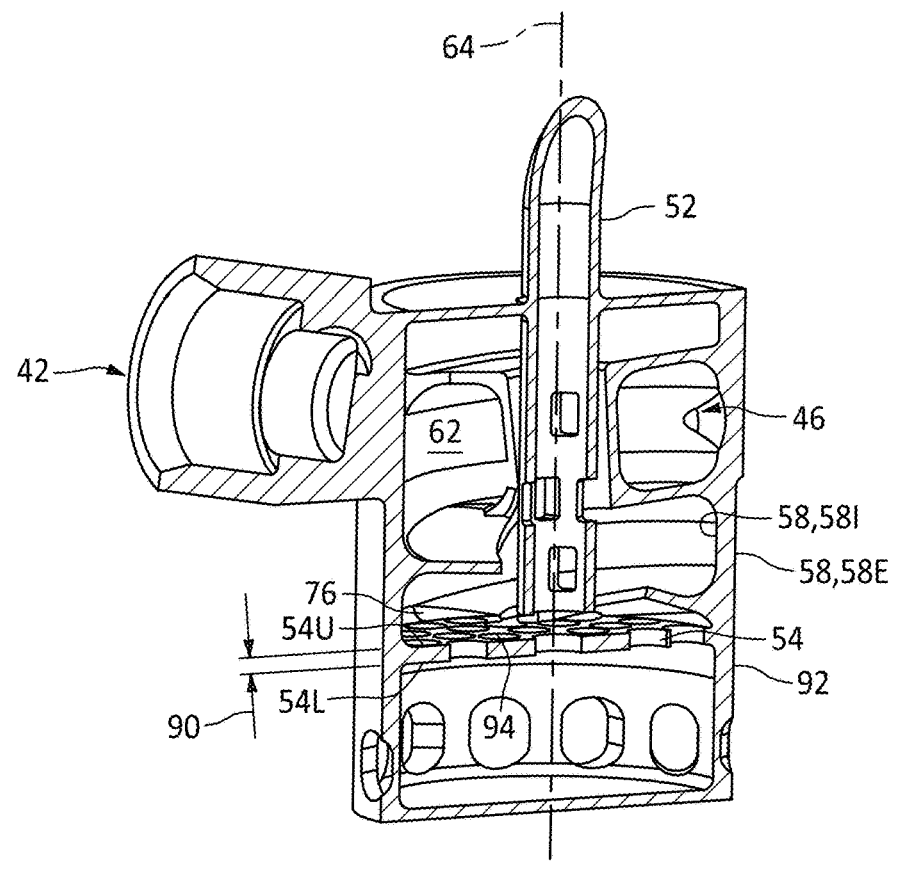
FIG. 7 is a diagrammatic sectional view of a de-aerator embodiment.
Figure 8:
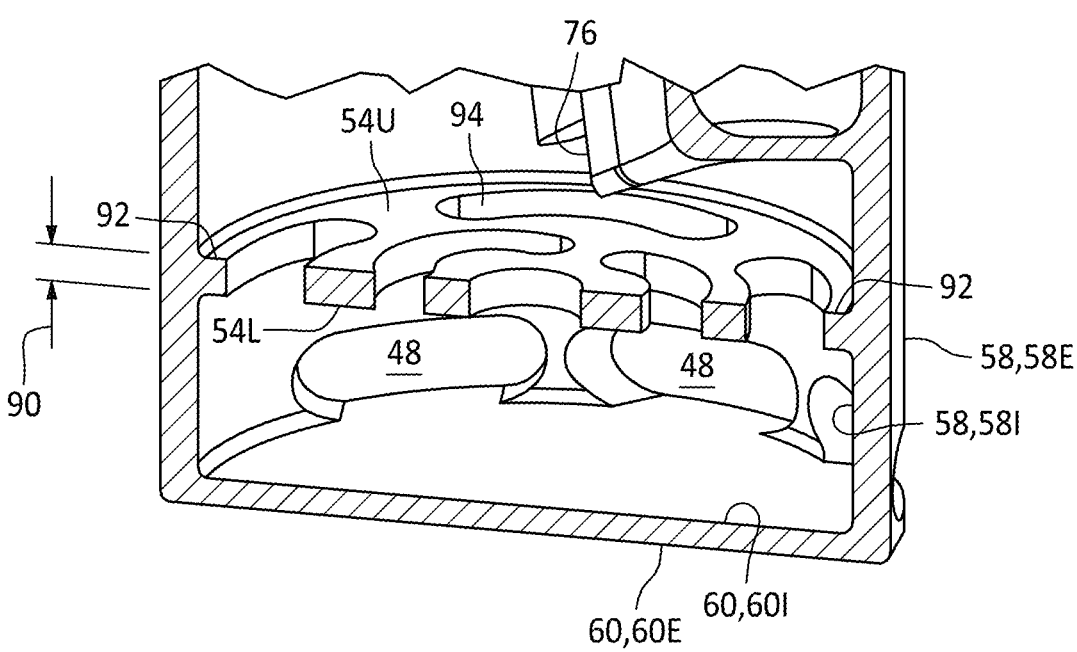
FIG. 8 is a diagrammatic sectional partial view of a de-aerator embodiment.
Figure 9:
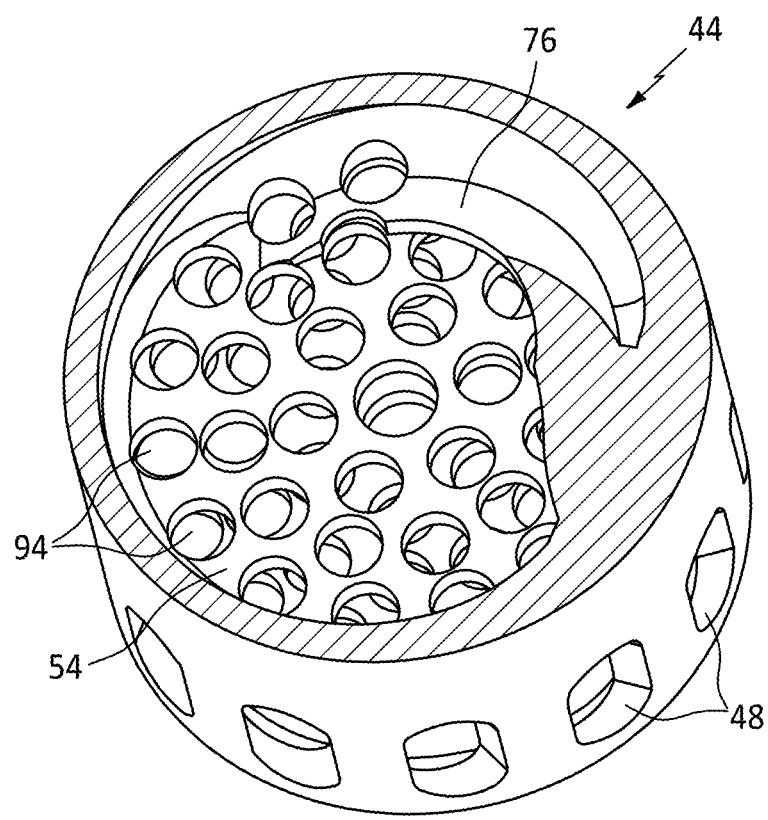
FIG. 9 is a diagrammatic sectional partial view of a de-aerator embodiment.

The de-aerator 36 embodiments shown in FIGS. 4, 7, and 8 include a single partition 54 having an upper surface 54U and a lower surface 54L and a plurality of apertures 94 extending through the thickness 90 of the partition 54 between the upper and lower surfaces 54U. 54L. The partition 54 shown in FIGS. 4 and 8 have slot-like apertures 94 extending through the partition 54 that vary in size. The apertures 94 may be disposed in patterns concentric about the central axis 64 of the de-aerator 36; e.g., with a first concentric pattern disposed radially inside of a second concentric pattern. The partitions 54 shown in FIGS. 6, 7, and 9 include a plurality of circular apertures 94 extending through the partition 54. In FIG. 7 the circular apertures 94 are all the same diameter but in some embodiments the apertures 94 may include different diameter apertures 94. The present disclosure is not limited to any particular partition aperture 94 configuration or any particular number of apertures 94. The number and configuration of the apertures 94 may be chosen based on the fluid volumetric rate through the de-aerator 36 to ensure constant fluid volumetric rate through the de-aerator 36 even under maximum flow conditions. The de-aerator 36 embodiments shown in FIGS. 3, 6, and 9 include a pair of partitions 54 configured in the manner described above.

FIG. 5 illustrates a de-aerator 36 having a partition 54 without apertures 94. This partition 54 is configured so that at least a part of the circumferential edge 92 of the partition 54 is spaced apart from the interior sidewall surface 58I to form a fluid passage between the circumferential edge 92 of the partition 54 and the interior sidewall surface 58I.

The partition 54 examples described above are provided to illustrate partition 54 configurations and the present disclosure is not limited to these examples. For example, in alternative embodiments a partition 54 may include more than one aperture configuration (e.g., slots and circles), or a partition 54 may include apertures 94 and may be configured so that at least a part of the circumferential edge 92 of the partition 54 is spaced apart from the interior sidewall surface 58I to form a fluid passage there between, or a first partition 54 may have a first configuration (e.g., including apertures 94—see FIG. 4) and a second partition 54 differently configured (e.g., circumferential edge passages—see FIG. 5), or any combination thereof.

Partition 54 configurations may be chosen to create a fluid flow with decreased velocity that falls gravimetrically to the base of the de-aerator 36. For example, the thickness 90 (see FIG. 8) of any of these partition 54 embodiments may be greater or lesser to improve fluid flow into the base of the de-aerator 36 that facilitates de-aeration.

Figure 10:
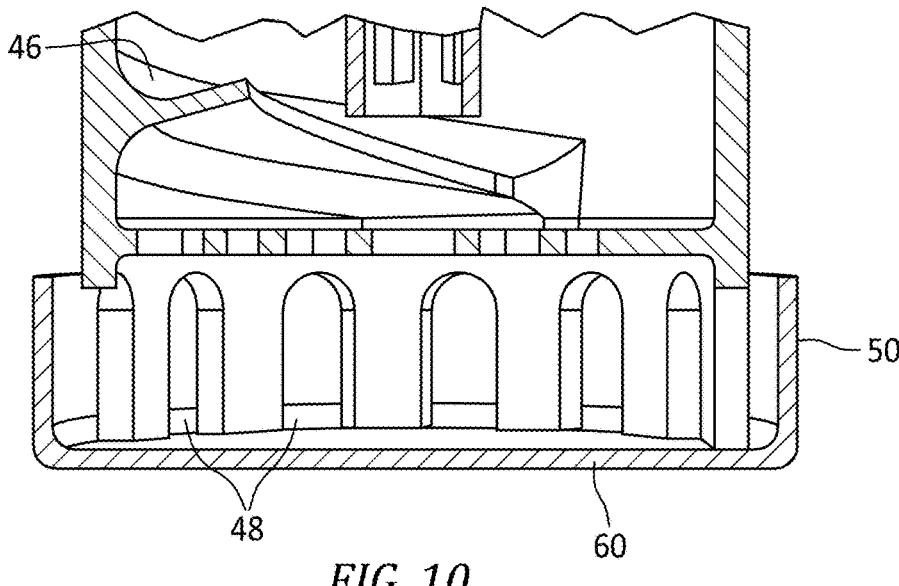
FIG. 10 is a diagrammatic sectional partial view of a de-aerator embodiment.
Figure 11:
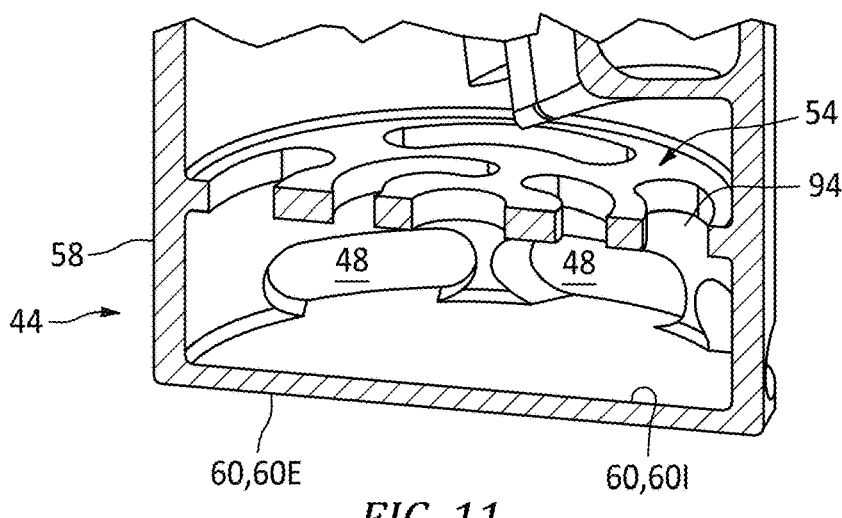
FIG. 11 is a diagrammatic sectional partial view of a de-aerator embodiment.
Figure 12:
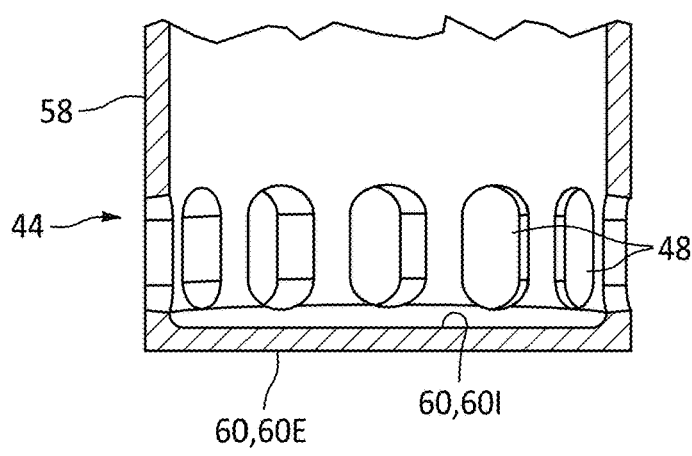
FIG. 12 is a diagrammatic sectional partial view of a de-aerator embodiment.
Figure 13:
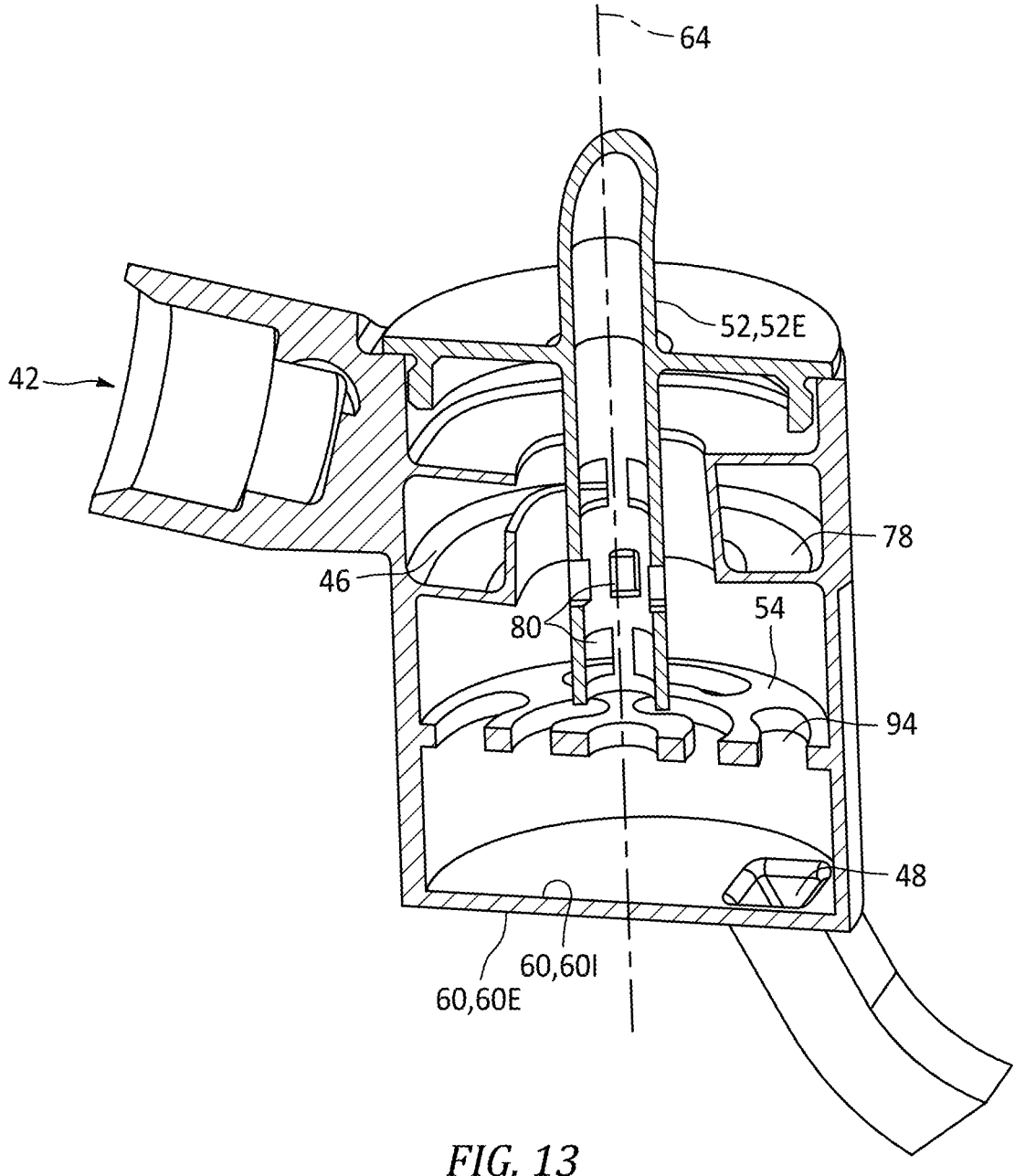
FIG. 13 is a diagrammatic sectional view of a de-aerator embodiment.

The de-aerator 36 may include one or more fluid outlets 48 disposed in the sidewall 58 (e.g., see FIGS. 10-12) or one or more fluid outlets 48 disposed in the base panel 60 (e.g., see FIG. 13). The present disclosure is not limited to any particular fluid outlet geometry or positioning. For example, the fluid outlets 48 shown in FIGS. 10-12 have different oval-like configurations. The oval-like fluid outlets 48 shown in FIGS. 10 and 12 have their long axes extending substantially parallel to the central axis 64 of the de-aerator 36, whereas the oval-like fluid outlets 48 shown in FIG. 11 have their short axes extending substantially parallel to the central axis 64 of the de-aerator 36. In some embodiments, a surface of the fluid outlets 48 may be flush with the interior surface of the base panel 60 (e.g., see FIGS. 10 and 11). In some embodiments, the fluid outlets 48 may not be flush with the interior surface of the base panel 60 (e.g., see FIG. 12); i.e., spaced a distance axially up from the interior surface of the base panel 60.

In some embodiments, the de-aerator 36 may include a fluid collection body 50 disposed radially outside of the sidewalls 58. The fluid collection body 50 is generally concentric with, but radially spaced apart from, the sidewall exterior surface 58E to form an annular cavity there between; e.g., see FIGS. 3 and 6. In these embodiments, piping or other conduit means may be in communication with the fluid collection body 50 to receive de-aerated fluid therefrom.

In some embodiments, the cover panel 56 may be an independent element that is configured for attachment to the one or more sidewalls 58. For example, the cover panel 56 diagrammatically shown in FIG. 13 is independent of the de-aerator body 44 and is configured for attachment to the de-aerator body 44. In the embodiment shown in FIG. 13, the vent tube 52 is integrally formed with the cover panel 56. A sealing element (e.g., an O-ring or the like) may be used to create a fluidic seal between the cover panel 56 and the de-aerator body 44.

In some embodiments, one or more elements of the de-aerator 36 may be produced independently of other elements and the de-aerator 36 formed as an assembly. An example of this configuration is described above where the cover panel 56 and the vent tube 52 are independent of the de-aerator body 44. In some embodiments, elements of the de-aerator 36 may be formed as an integral unit/unitary structure. For example, the de-aerator 36 embodiment shown in FIG. 3 has a fluid inlet 42, a body 44, a vent tube 52, a helical fluid passage 46, a base panel 60, partitions 54, and a fluid collection body 50 formed as a unitary structure. Such a structure may be formed using additive manufacturing techniques, or 3D printing techniques, or the like. In some embodiments, portions of the de-aerator 36 (e.g., the fluid inlet 42, body 44, helical fluid passage 46, partitions 54, and base panel 60) may be formed as a unitary structure that can be assembled with other elements to produce the de-aerator 36.

While the principles of the disclosure have been described above in connection with specific apparatuses and methods, it is to be clearly understood that this description is made only by way of example and not as limitation on the scope of the disclosure. Specific details are given in the above description to provide a thorough understanding of the embodiments. However, it is understood that the embodiments may be practiced without these specific details.

The singular forms "a," "an," and "the" refer to one or more than one, unless the context clearly dictates otherwise. For example, the term "comprising a specimen" includes single or plural specimens and is considered equivalent to the phrase "comprising at least one specimen." The term "or" refers to a single element of stated alternative elements or a combination of two or more elements unless the context clearly indicates otherwise. As used herein, "comprises" means "includes." Thus, "comprising A or B," means "including A or B, or A and B," without excluding additional elements.

It is noted that various connections are set forth between elements in the present description and drawings (the contents of which are included in this disclosure by way of reference). It is noted that these connections are general and, unless specified otherwise, may be direct or indirect and that this specification is not intended to be limiting in this respect. Any reference to attached, fixed, connected or the like may include permanent, removable, temporary, partial, full and/or any other possible attachment option.

No element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprise", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

While various inventive aspects, concepts and features of the disclosures may be described and illustrated herein as embodied in combination in the exemplary embodiments, these various aspects, concepts, and features may be used in many alternative embodiments, either individually or in various combinations and sub-combinations thereof. Unless expressly excluded herein all such combinations and sub-combinations are intended to be within the scope of the present application. Still further, while various alternative embodiments as to the various aspects, concepts, and features of the disclosures—such as alternative materials, structures, configurations, methods, devices, and components, and so on—may be described herein, such descriptions are not intended to be a complete or exhaustive list of available alternative embodiments, whether presently known or later developed. Those skilled in the art may readily adopt one or more of the inventive aspects, concepts, or features into additional embodiments and uses within the scope of the present application even if such embodiments are not expressly disclosed herein. For example, in the exemplary embodiments described above within the Detailed Description portion of the present specification, elements may be described as individual units and shown as independent of one another to facilitate the description. In alternative embodiments, such elements may be configured as combined elements. It is further noted that various method or process steps for embodiments of the present disclosure are described herein. The description may present method and/or process steps as a particular sequence. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the description should not be construed as a limitation.

The invention claimed is:

1. A de-aerator for an oil system of a gas turbine engine, comprising:

a body extending between a first axial end and a second axial end opposite the first axial end, the body having at least one sidewall that extends between the first axial end and the second axial end, and a base panel connected to the at least one sidewall at the second axial end, wherein the base panel and the at least one sidewall define an internal cavity of the body;

a cover panel connected to the body at the first axial end;

a fluid inlet in communication with the body at the first axial end, the fluid inlet having an internal flow passage configured to direct fluid tangentially into the internal cavity;

a helical fluid passage disposed within the internal cavity having an entry end and an exit end, the entry end disposed to receive fluid from the fluid inlet, the helical fluid passage having a plurality of circumferential turns that collectively axially descend toward the second axial end of the body;

at least one partition disposed within the internal cavity at the exit end of the helical fluid passage and spaced above the base panel of the de-aerator; and at least one fluid outlet disposed adjacent the base panel, the at least one fluid outlet configured to permit liquid passage from the internal cavity of the body to outside the body;

wherein the helical fluid passage includes at least one helically extending panel that extends radially inwardly from an interior surface of the at least one sidewall to an inner radial edge, and an inner radial wall joined to the inner radial edge of the helically extending panel.

2. The de-aerator of claim 1, wherein the helical fluid passage is an enclosed passage.

3. The de-aerator of claim 2, further comprising a plurality of vent apertures disposed in the inner radial wall.

4. The de-aerator of claim 1, wherein the inner radial wall extends axially a distance and defines a passage above the inner radial wall configured to permit passage of air out of the helical fluid passage and into a central region of the de-aerator.

5. A de-aerator for an oil system of a gas turbine engine, comprising:

a body extending between a first axial end and a second axial end opposite the first axial end, the body having at least one sidewall that extends between the first axial end and the second axial end, and a base panel connected to the at least one sidewall at the second axial end, wherein the base panel and the at least one sidewall define an internal cavity of the body;

a fluid inlet in communication with the body at the first axial end, the fluid inlet having an internal flow passage configured to direct fluid tangentially into the internal cavity;

a helical fluid passage disposed within the internal cavity having an entry end and an exit end, wherein the entry end is disposed to receive fluid from the fluid inlet, and wherein the helical fluid passage has a plurality of circumferential turns that collectively axially descend toward the second axial end of the body;

wherein the helical fluid passage includes at least one helically extending panel that extends radially inwardly from an interior surface of the at least one sidewall to an inner radial edge, and an inner radial wall disposed at the inner radial edge of the helically extending panel;

at least one partition disposed within the internal cavity at the exit end of the helical fluid passage and spaced above the base panel of the de-aerator; and at least one fluid outlet configured to permit liquid passage from the internal cavity of the body to outside the body.

6. The de-aerator of claim 5, further comprising a cover panel connected to the body at the first axial end.

7. The de-aerator of claim 5, wherein the at least one helically extending panel includes a first helically extending panel segment and a second helically extending panel segment and the inner radial wall extends between the first helically extending panel segment and the second helically extending panel segment.

8. The de-aerator of claim 7, further comprising one or more vent apertures disposed in the inner radial wall.

9. The de-aerator of claim 5, wherein the at least one partition is disposed within the internal cavity in a plane that is substantially perpendicular to a central axis of the de-aerator.

10. The de-aerator of claim 9, wherein the at least one partition has an upper surface, a lower surface, a thickness extending between the upper surface and the lower surface, and a plurality of apertures extending through the partition between the upper surface and the lower surface.

11. The de-aerator of claim 10, wherein the apertures of the plurality of apertures are arranged in patterns concentric with the central axis.

12. The de-aerator of claim 10, wherein at least one aperture of the plurality of apertures has a slot configuration.

13. The de-aerator of claim 10, wherein at least one aperture of the plurality of apertures has a circular configuration.

14. The de-aerator of claim 5, wherein the at least one partition includes a first partition and a second partition axially spaced apart from one another.

15. The de-aerator of claim 5, wherein the at least one partition has an upper surface, a lower surface, a thickness extending between the upper surface and the lower surface, and a circumferential edge; and wherein the at least one sidewall has an interior sidewall surface and at least a portion of the partition circumferential edge is spaced apart from the interior sidewall surface thereby forming a passage between the circumferential edge and the interior sidewall surface.

16. The de-aerator of claim 5, wherein the internal flow passage extends along a path having a circumferential component and an axial component.

17. The de-aerator of claim 5, wherein the internal flow passage includes at least one swirl groove.

18. The de-aerator of claim 5, wherein the at least one fluid outlet comprises a plurality of fluid outlets.

19. The de-aerator of claim 5, wherein the at least one fluid outlet is disposed in the at least one side wall contiguous with the base panel.

* * * * *